US011235628B1

(12) United States Patent
Davis

(10) Patent No.: US 11,235,628 B1
(45) Date of Patent: Feb. 1, 2022

(54) VALVE STEM HOLE TIRE SEATING DEVICE

(71) Applicant: Steven Davis, Woodbury, TN (US)

(72) Inventor: Steven Davis, Woodbury, TN (US)

(73) Assignee: Hennessy Industries, Inc., LaVergne, TN (US)

( * ) Notice: Subject to any disclaimer, the term of this patent is extended or adjusted under 35 U.S.C. 154(b) by 665 days.

(21) Appl. No.: 15/871,514

(22) Filed: Jan. 15, 2018

Related U.S. Application Data

(60) Provisional application No. 62/446,174, filed on Jan. 13, 2017.

(51) Int. Cl.
*F16K 15/20* (2006.01)
*B60C 29/00* (2006.01)
*B60C 29/06* (2006.01)
*B60C 29/02* (2006.01)

(52) U.S. Cl.
CPC ............ *B60C 29/005* (2013.01); *B60C 29/02* (2013.01); *B60C 29/06* (2013.01); *Y10T 137/3584* (2015.04)

(58) Field of Classification Search
CPC .. B60C 25/145; B60C 25/18; Y10T 137/3584
USPC ............................. 137/231; 141/38; 29/221.5
See application file for complete search history.

(56) References Cited

U.S. PATENT DOCUMENTS

| | | | | | |
|---|---|---|---|---|---|
| 2,913,035 A | * | 11/1959 | Lapin | ................... | B60C 25/145 152/415 |
| 2,929,432 A | * | 3/1960 | Funk | ..................... | B60C 29/062 152/415 |
| 2,969,824 A | * | 1/1961 | Howard | .................. | B60C 17/01 152/340.1 |
| 3,552,469 A | * | 1/1971 | Corless | ................. | B60C 25/145 157/1.1 |
| 3,866,654 A | * | 2/1975 | Duquesne | ............. | B60C 25/145 157/1.1 |
| 4,513,803 A | * | 4/1985 | Reese | ..................... | B60C 5/001 141/302 |
| 5,168,911 A | * | 12/1992 | Gottschalk | ............ | B60C 25/145 141/95 |
| 5,247,982 A | * | 9/1993 | Miller | ................... | B60C 25/145 157/1.1 |
| 5,570,733 A | * | 11/1996 | Desparois | ............. | B60C 25/145 157/1.1 |

(Continued)

FOREIGN PATENT DOCUMENTS

WO    WO13111645    8/2013

*Primary Examiner* — Robert K Arundale
(74) *Attorney, Agent, or Firm* — Patterson Intellectual Property Law, P.C.; Ryan D. Levy; Mark A. Kilgore

(57) ABSTRACT

Briefly, the present invention relates, in one embodiment, to an air channeling apparatus for sealing a tubeless tire on a corresponding wheel rim. The air channeling apparatus may have a supply end and an insertion end opposite the supply end. The supply end may be directly or indirectly connected to an air supply that supplies pressurized air. The air channeling apparatus is further sized to be inserted through the valve stem hole of a wheel rim. An inner surface of the air channeling apparatus includes threads that can thread onto a valve stem of the wheel. At least one opening in the air channeling apparatus may blast pressurized air into the space between the wheel rim and the tubeless tire.

17 Claims, 8 Drawing Sheets

(56) References Cited

U.S. PATENT DOCUMENTS

| | | | | |
|---|---|---|---|---|
| 5,878,801 | A  * | 3/1999 | Ellis | B60C 25/145 |
| | | | | 157/1.1 |
| 8,733,419 | B2 * | 5/2014 | White | B60C 29/064 |
| | | | | 157/1.1 |
| 9,346,331 | B2 * | 5/2016 | Lundberg | F16K 31/602 |
| 9,623,711 | B2 * | 4/2017 | Yates | B60C 25/145 |
| 2009/0188570 | A1 * | 7/2009 | Lin | B60S 5/04 |
| | | | | 137/231 |
| 2011/0247760 | A1 * | 10/2011 | White | B60C 25/145 |
| | | | | 157/1.17 |
| 2017/0088102 | A1 * | 3/2017 | Davidson | B60C 25/145 |

* cited by examiner

VALVE STEM HOLE TIRE SEATING DEVICE

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates generally to devices and methods for sealing a tubeless tire on a corresponding wheel rim. More particularly, the present invention pertains to a device and method for sealing a tubeless tire on a corresponding wheel rim by introducing air through a valve stem hole defined in the wheel rim.

The advent of pneumatic tires saw a great improvement over solid rubber tires. These pneumatic tires provided a much smoother ride to the occupants and cargo of a vehicle. The first pneumatic tires included a rim system, a tire with tread and sidewalls that fitted to the rim, and a tube inside the cavity between the rim and tire. The tube system allowed pressurized air to be captured and to increase or decrease the pressure inside the tire. The pressure was adjusted via a valve system that was attached to the tube and protruded through a hole in the rim. The diameter of the hole in the rim was approximately half of an inch in diameter.

In the 1950s and 1960s, the tubeless tire was introduced and implemented. The tubeless tire eliminated the need for the tube inside the tire and rim. The benefit of the tubeless tire was the reduction of a heat buildup in the tire. As such, the tire mileage was increased significantly, as was the ride quality for occupants of the corresponding vehicle.

A new issue for tire installers presented itself with this new design. The issue was the capturing of air between the rim and the tire. Several ideas were used to address this issue.

Some of the first designs included mechanical straps that, when used, reduced the tread center line. This reduction resulted in the tire sidewalls being pushed against the rim. These devices were effective for narrow bias ply tires. The strap devices were very dangerous, however, if not removed as soon as air was captured between the tire and the rim. Using the strap device on a tire was also relatively time consuming.

Later designs included mechanical devices to pull the tire in one direction and create a seal on one side between the tire and rim. The opposite side of the tire was then mechanically sealed against a pressurized chamber. This pressurized chamber caused the lower sidewall of the tire to expand to the rim flange. This process is still used today in automated manufacturing plants where tires and wheels are the same size one after the other. The system must be changed over, however, for different tire sizes.

Another method that is used today is a bead blast method. In this approach, a relatively large volume of air at a relatively high pressure is aimed, or blasted, into the space between the tire sidewall and the rim flange from outside the sidewall and rim. This method requires the opposite side of the tire to be held against the opposite rim flange to create a semi bead seal. Once the pressure in the tire slightly exceeds the atmospheric pressure, the beads will expand, or move, to the rim flanges to create a bead seal. At this point, pressurized air can be injected into the tire to increase the tire pressure to the desired amount.

What is needed, then, is a device that creates a bead seal between the tire and wheel rim that uses less pressurized air and can be performed relatively quickly and easily.

BRIEF SUMMARY OF THE INVENTION

Briefly, the present invention relates, in one optional embodiment, to an air channeling apparatus for sealing a tubeless tire on a corresponding wheel rim. The air channeling apparatus may have a supply end and an insertion end opposite the supply end. The supply end may be directly or indirectly connected to an air supply that supplies pressurized air. The air channeling apparatus may be sized to be inserted through the valve stem hole of a wheel rim. An inner surface of the air channeling apparatus may include threads that can thread onto another threaded surface. At least one opening in the air channeling apparatus may blast pressurized air into the space between the wheel rim and the tubeless tire.

In some optional embodiments, the outer surface of the air channeling apparatus may include a second outer surface diameter sized such that the apparatus may only be inserted through the valve stem hole a predetermined distance.

The air channeling apparatus may further comprise at least one seal disposed about the outer surface configured to engage the wheel rim.

Further, the air channeling apparatus may comprise at least one seal disposed about the apparatus at a transition from the first maximum outer surface diameter to the second maximum outer surface diameter, wherein the seal is configured to engage the wheel rim.

Additionally, the air channeling apparatus may include at least one first seal disposed about the apparatus. The first seal may be located at a transition from the first outer surface diameter to the second outer surface diameter. The apparatus may also include at least one second seal disposed about the first outer surface, the at least one second seal located between the at least one first seal and at least one opening.

The air channeling apparatus may include at least one opening defined in the apparatus. In some embodiments, the apparatus includes a plurality of openings.

The plurality of openings defined in the apparatus may be configured to direct pressurized air in a direction substantially perpendicular to the apparatus. Alternatively, or in addition, the plurality of openings defined in the apparatus may be configured to direct pressurized air at an oblique angle in reference to the apparatus.

In one optional embodiment, the air channeling apparatus may comprise a valve assembly configured to allow pressurized air to pass from the air supply to the air channeling apparatus through a valve. In some embodiments, the valve assembly may further comprise a foot-pedal configured to actuate the valve. In other optional embodiments, the valve assembly may further comprise a trigger which may be hand operated to actuate the valve.

In one optional embodiment, the air channeling apparatus may include a pressure gauge configured to display the pressure between the rim and tire.

Further, one optional embodiment may include a pressure relief valve configured to relieve pressure when a threshold pressure is achieved. The threshold pressure may be between 20 and 40 psi.

The air channeling apparatus may include an inner surface which is configured to threadingly engage a valve stem.

In another optional embodiment, the air channeling apparatus may further include a tether member which has a first end and second end. The first end may be configured to threadingly insert into the insertion end. The second end may be configured to threadingly engage the valve stem. In some embodiments, the tether member may comprise at least one flexible portion.

The air channeling apparatus may include at least a portion of the outer surface which may comprise a non-marring material along the insertion end.

The present invention also relates, in one optional embodiment, to a method of sealing a tubeless tire on a corresponding wheel rim. The method may include threading an air channeling apparatus onto a valve stem disposed in a valve stem hole defined in the wheel rim; inserting an insertion end of the air channeling apparatus into a space between the tire and the rim through the valve stem hole with the valve stem retained on the insertion end of the air channeling apparatus; blasting at least one stream of pressurized air into the space between the tire and the rim through the air channeling apparatus and through at least one opening defined in the air channeling apparatus; sealing the tire to the rim; withdrawing the insertion end of the air channeling apparatus from the space between the tire and the rim through the valve stem hole; securing the valve stem in place in the valve stem hole; and unthreading the air channeling apparatus from the valve stem.

DETAILED DESCRIPTION OF THE INVENTION

Reference will now be made in detail to embodiments of the present invention, one or more drawings of which are set forth herein. Each drawing is provided by way of explanation of the present invention and is not a limitation. In fact, it will be apparent to those skilled in the art that various modifications and variations can be made to the teachings of the present invention without departing from the scope of the invention. For instance, features illustrated or described as part of one embodiment can be used with another embodiment to yield a still further embodiment.

Thus, it is intended that the present invention covers such modifications and variations as come within the scope of the appended claims and their equivalents. Other objects, features, and aspects of the present invention are disclosed in, or are obvious from, the following detailed description. It is to be understood by one of ordinary skill in the art that the present discussion is a description of exemplary embodiments only and is not intended as limiting the broader aspects of the present invention.

The words "connected", "attached", "joined", "mounted", "fastened", and the like should be interpreted to mean any manner of joining two objects including, but not limited to, the use of any fasteners such as screws, nuts and bolts, bolts, pin and clevis, and the like allowing for a stationary, translatable, rotatable, or pivotable relationship; welding of any kind such as traditional MIG welding, TIG welding, friction welding, brazing, soldering, ultrasonic welding, torch welding, inductive welding, and the like; using any resin, glue, epoxy, and the like; being integrally formed as a single part together; any mechanical fit such as a friction fit, interference fit, slidable fit, rotatable fit, pivotable fit, and the like; any combination thereof; and the like.

Unless specifically stated otherwise, any part of the apparatus of the present invention may be made of any appropriate or suitable material including, but not limited to, metal, alloy, polymer, polymer mixture, wood, composite, or any combination thereof.

Figure 1:
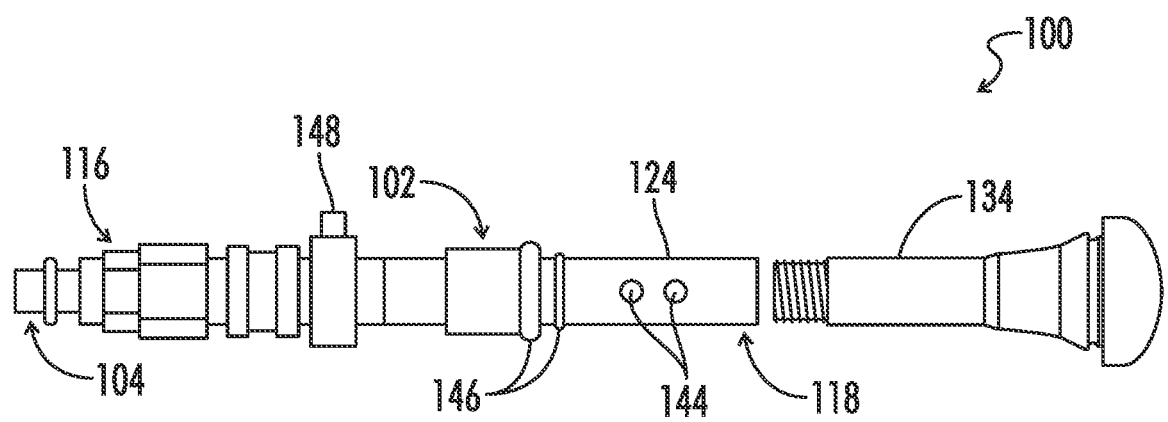
FIG. 1 is a side view of one embodiment of the air channeling device.

Referring particularly to FIG. 1, an air blast assembly 100 is shown. The air blast assembly 100 may include an air channeling apparatus 102. The air channeling apparatus 102 may include a supply end 104 configured to receive pressurized air 106 from an air supply 108 (shown schematically in at least FIG. 4). The air channeling apparatus 102 may be made of any appropriate material and may be flexible, semi-flexible, rigid, or may include portions that are relatively flexible and portions that are relatively rigid.

In some embodiments, the insertion end 118 of the air channeling apparatus 102 may be tubular. A tubular profile may be preferred as this will allow the apparatus 102 to be inserted into a valve stem opening 132 which may be round. In other embodiments, the insertion end 118 may be of any shape which allows insertion of the apparatus 102 into a valve stem opening 132.

Figure 8:
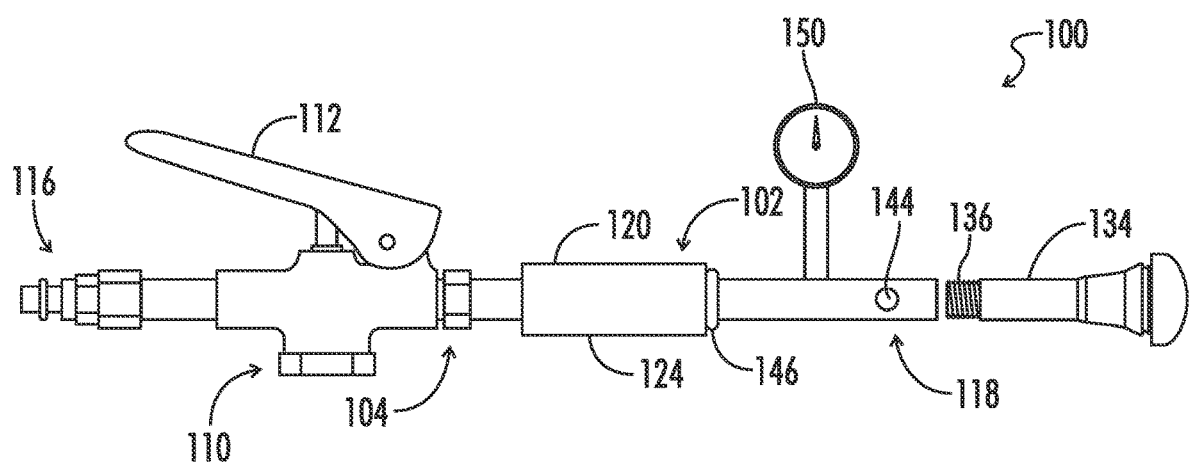
FIG. 8 is a side view of a separate embodiment of the air channeling device.

In some embodiments, the air blast assembly 100 may include a valve assembly 110 connected to the supply end 104 of the air channeling apparatus 102 (shown in FIG. 8). The valve assembly 110 may selectively allow pressurized air 106 to pass from the air supply 108 to the air channeling apparatus 102. The valve assembly 110 may be connected to the air channeling apparatus 102 in any appropriate manner. Some embodiments may include the valve assembly 110 forming an integral part of the air channeling apparatus 102 anywhere along the air channeling apparatus. Still other embodiments may have a valve assembly 110 connected to a supply line 114 that is also connected to the air channeling apparatus 102.

In some embodiments, the valve assembly 110 may be actuated by a trigger 112 upon engagement by a user. In one embodiment, the trigger 112 may be hand-operated by a user. In other embodiments, actuation of the valve assembly 110 may be foot-operated wherein a pedal may be used to actuate the valve assembly 110, thus allowing the operator to have both hands free to use in manipulating the air channeling apparatus 102 or the tire 128 and rim 130. In yet another embodiment, the valve assembly 110 may be actuated when the user inserts the apparatus 102 into the valve stem hole 132 and contacts the apparatus against the rim 130. Upon contact, the user may push the apparatus 102 so as to depress the actuator of the valve assembly 110. In yet another embodiment, the valve assembly 110 may be threadingly engaged with the air channeling apparatus 102. In some embodiments, the valve assembly 110 may be controlled by mechanical, electrical, or pneumatic actuation.

The air channeling apparatus may include a pressure relief valve. The pressure relief valve 148 may be integral to the valve assembly 110, or may be separate. The pressure relief valve 148 may act to prohibit the pressure inside the space between the tire 128 and rim 130 from surpassing a predetermined threshold pressure. When the pressure inside the space between the tire 128 and rim 130 reaches the predetermined threshold pressure, the pressure relief valve 148 may be actuated to vent the pressurized air to the atmosphere and prohibit the pressure from surpassing the threshold. In some embodiments, the threshold level may be 20 psi or greater. In some embodiments, the threshold level may be 25 psi or greater. In some embodiments, the threshold level may be 30 psi or greater. In some embodiments, the threshold level may be 35 psi or greater. In some embodiments, the threshold level may be 40 psi or greater. The pressure relief valve may be controlled by mechanical, electrical, or pneumatic actuation.

In addition to, or as an alternative to, the pressure relief valve, the air channeling apparatus 102 may also include a gauge 150 to assist in correct observation of pressure inside the space between the tire 128 and the wheel rim 130. The gauge 150 may be integral to the apparatus 102 or may be separate. The gauge 150 may be used to allow the user to monitor the pressure inside the space between the tire 128 and the wheel rim 130 so as to prevent over-inflation. Additionally, the gauge 150 may be used to help the user identify that the correct amount of pressure has been achieved to seal the tire under the specific application that is being used.

A quick-connect 116 may be connected to the valve assembly 110 in many embodiments. In some embodiments, the quick-connect 116 may additionally or alternatively be connected to the supply end 104 of the air channeling apparatus 102. In still other embodiments, quick-connects 116 may be used to connect at least one of the following: the valve assembly 110 to the air channeling apparatus 102, the valve assembly to a supply line 114, the air channeling apparatus to a supply line, and the like.

In addition to the supply end 104, the air channeling apparatus 102 may further include an insertion end 118. In some embodiments, the insertion end 118 of the air channeling apparatus 102 may be opposite the supply end 104. The insertion end 118 may be made of any appropriate or suitable material including, but not limited to, metal, alloy, polymer, polymer mixture, wood, composite, or any combination thereof. In some embodiments, the insertion end 118 may be made of non-marring material so as to decrease the chance of marring the rim 130 surface or outer surface 124 of the apparatus which may occur when the insertion end 118 contacts the rim surface. Suitable non-marring material may include, but is not limited to, urethane, polyurethane, rubber, copper, plastic, brass, aluminum, and the like.

In one embodiment, the insertion end 118 may rotate independently of the supply end 104 or other apparatus components. The independent rotation of the insertion end 118 may allow a user to thread the insertion end onto a valve stem 134 while holding the supply end 104 in a fixed position. Additionally, this independent rotation will allow the supply line 114 to remain attached to the air channeling apparatus 102 when threading the apparatus to a valve stem 134 without the supply line being twisted by the rotation.

As shown in FIG. 8, a handle 120 may be disposed on the air channeling apparatus 102 between the supply end 104 and the insertion end 118 in some embodiments. In one embodiment, the handle 120 is disposed closer to the supply end 104 than the insertion end 118. The handle 120 may include any appropriate material, but one embodiment may include the handle made at least partially of a polymer foam or other resilient material to provide an adequate grip for the user to securely hold the air blast assembly 100 during operation. The handle 120 alternatively or additionally may include a portion of the air channeling apparatus 102 that is shaped to accommodate the grip of a user. Non-limiting examples of possible handles 120 could include knurling, protrusions, indentations, and the like configured to receive the user's hand or hands.

Figure 5:
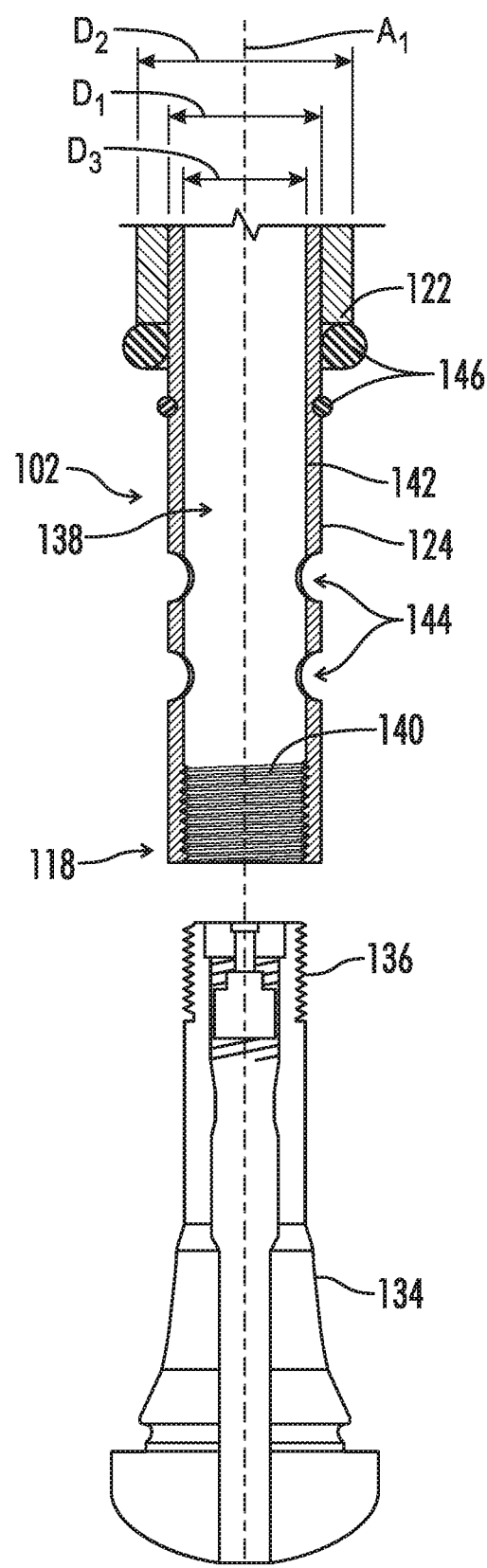
FIG. 5 is a cross-sectional view of the air channeling apparatus and a valve stem.
Figure 6:
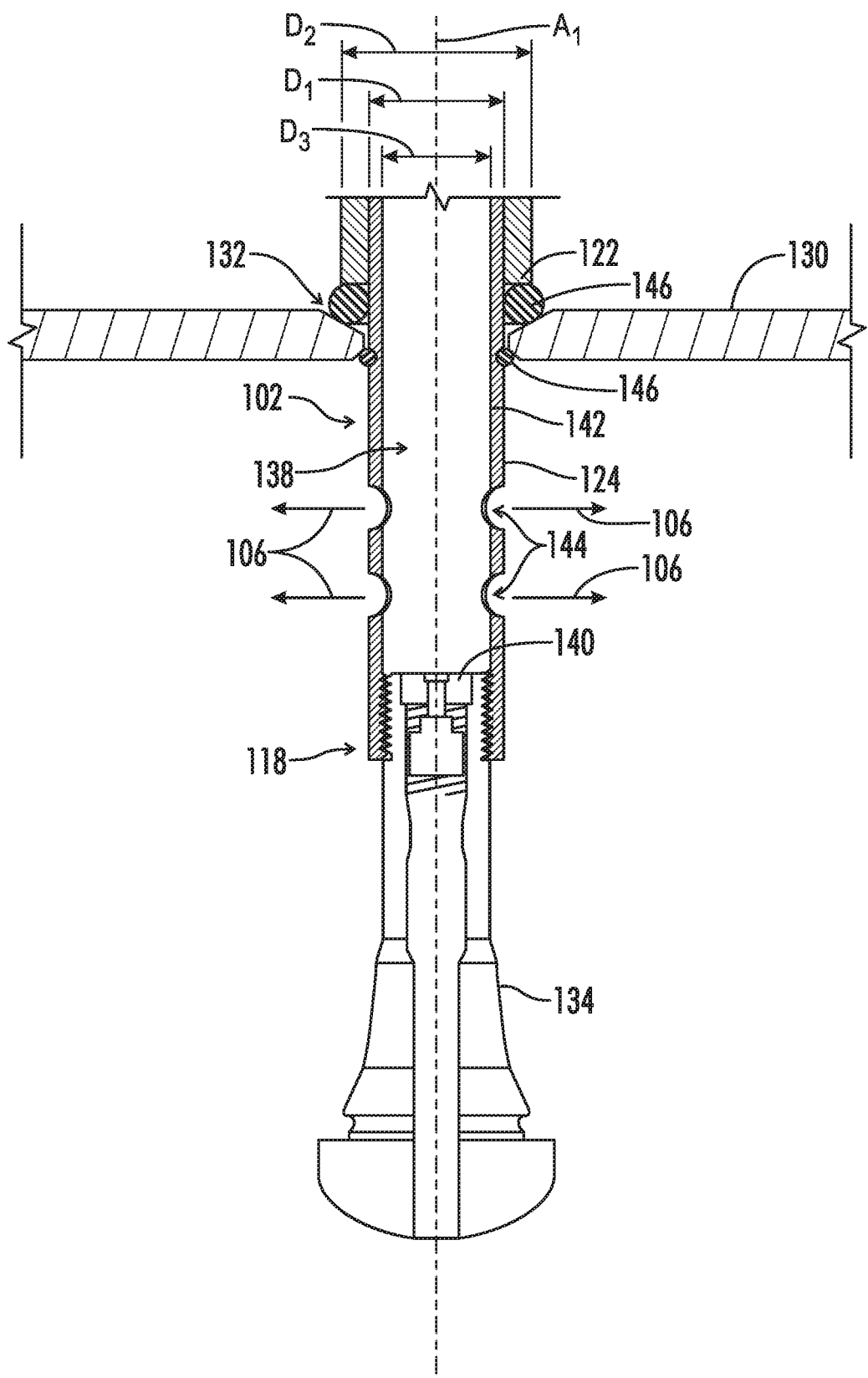
FIG. 6 is a cross-sectional view of the air channeling apparatus connected to a valve stem and engaging the wheel rim.

As shown at least in FIGS. 5 and 6, the air channeling apparatus 102, in some embodiments, may further include a shoulder 122 disposed between the supply end 104 and the insertion end 118. The shoulder 122 may be connected to or may be integral with the air channeling apparatus 102. Stated another way, the air channeling apparatus 102 may include an outer surface 124 having a first outer surface diameter D1 and a second outer surface diameter D2 (best shown in FIGS. 5-7). The second outer surface diameter D2 may be greater than the first outer surface diameter D1. In some embodiments, this difference in diameters D1, D2 may provide the air channeling apparatus 102 with a shoulder 122.

In yet another embodiment, the air channeling apparatus 102 may include at least one second outer diameter D2 which is greater than the first outer diameter D1, but where the intermediate portion between the two diameters D1, D2 is tapered toward the first outer diameter. Thus, a conical shape may be formed from the at least one second outer diameter D2 tapering down to the first outer diameter D1. In embodiments with more than two outer diameters, the third or more diameters may be greater or smaller diameters than the second outer diameter D2. The conical shape or shoulder 122 may remain at the transition between the first D1 and second D2 outer diameters and continue on to the third or more diameters, or, in some embodiments, the third or more diameters may have a smaller diameter while the conical shape or shoulder 122 remains at the first and second outer diameters.

Figure 2:
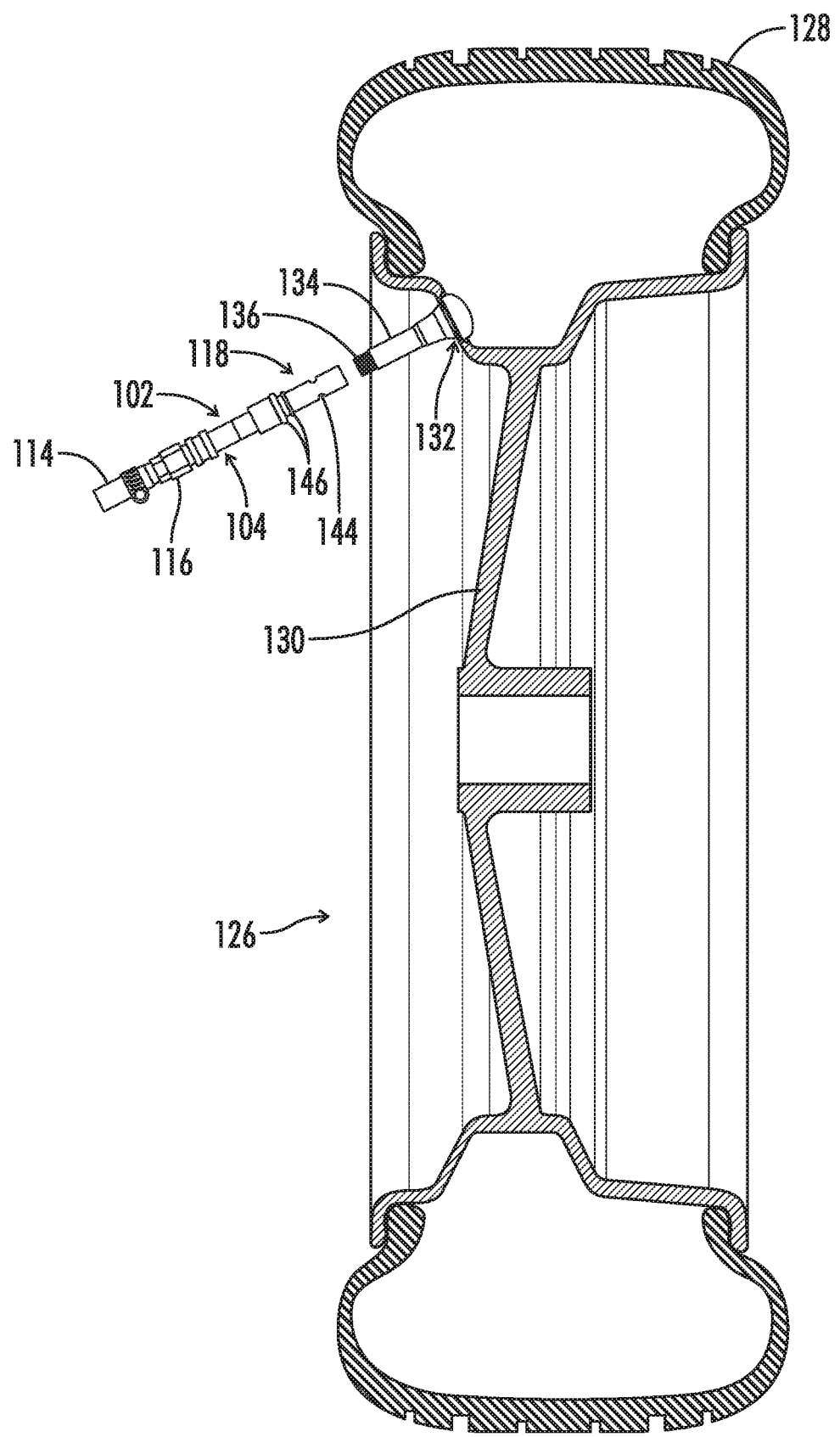
FIG. 2 is a cross-sectional view of a rim and tire combination with a valve stem installed in the rim and the air channeling apparatus apart from the valve stem.
Figure 3:
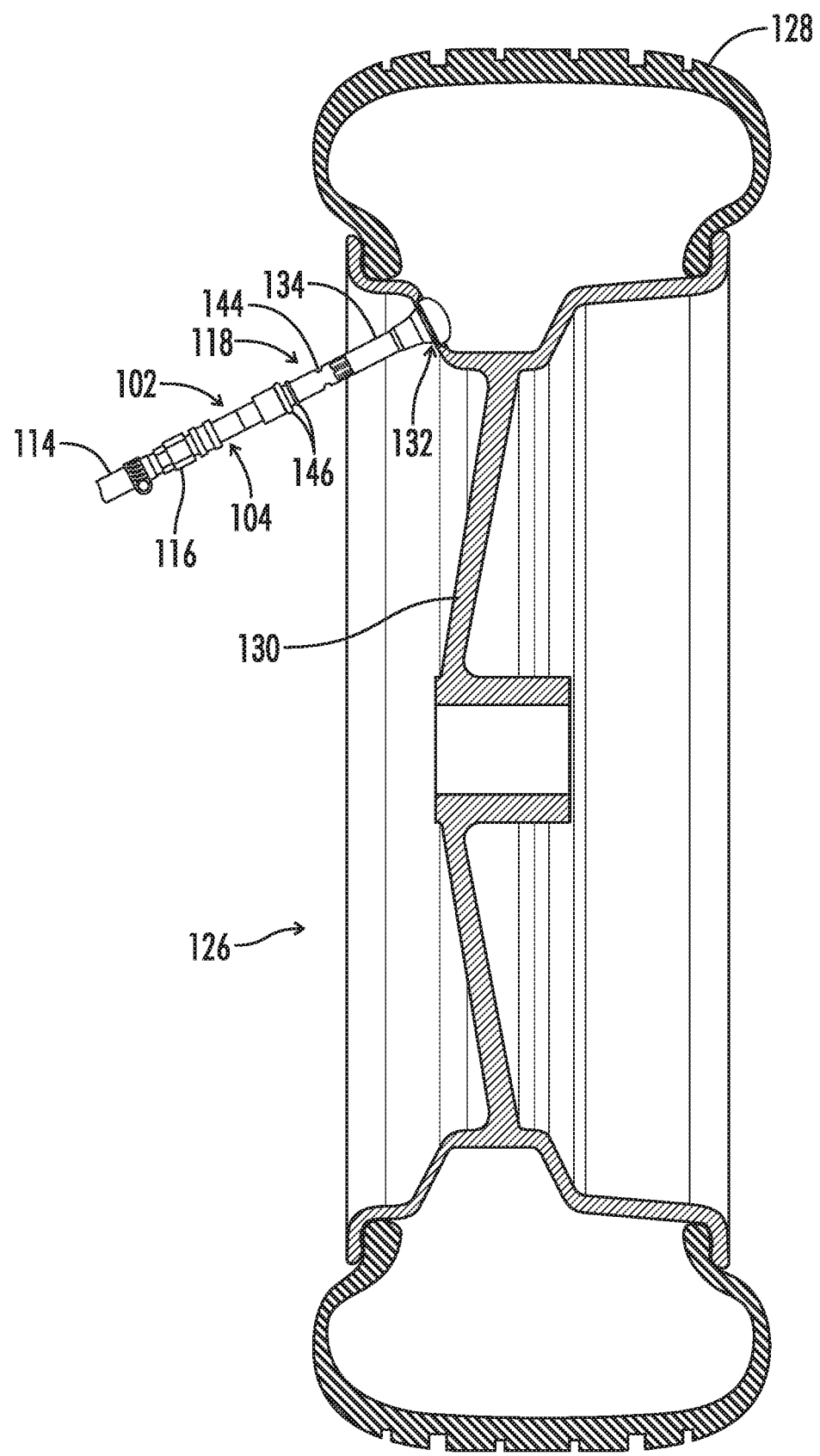
FIG. 3 is a cross-sectional view of a rim and tire combination with a valve stem installed in the rim and the air channeling apparatus connected to the valve stem.
Figure 4:
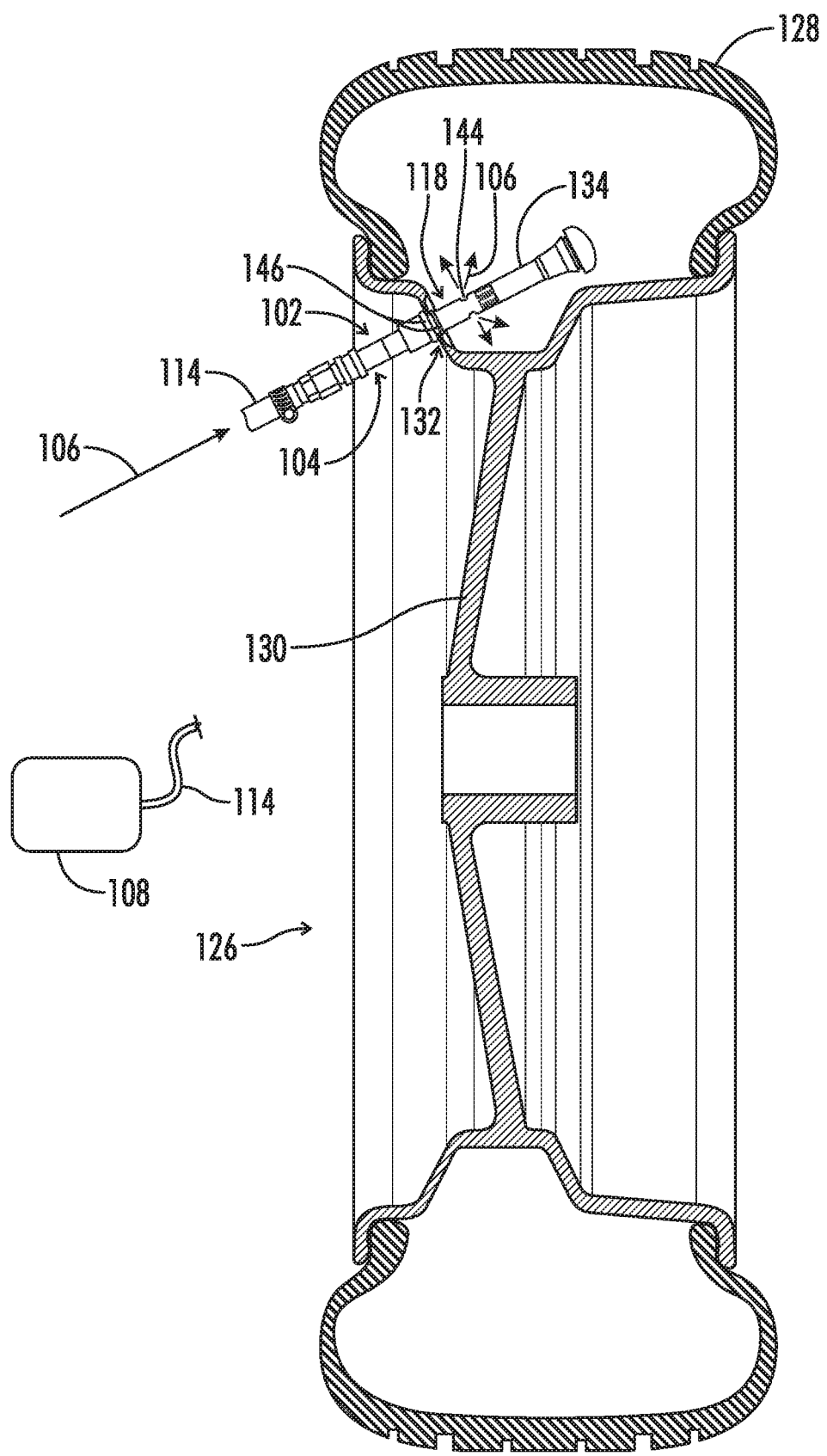
FIG. 4 is a cross-sectional view of a rim and tire combination with the air channeling apparatus inserted into the valve stem hole.

Shown generally in FIGS. 2-4, a wheel 126 may include a tire 128 and a corresponding wheel rim 130. Some embodiments of the air channeling apparatus 102 may include the first outer surface diameter D1 sized such that the insertion end 118 of the air channeling apparatus may pass through a valve stem opening, or valve stem hole, 132 defined in the wheel rim 130. The shoulder 122, or the second outer surface diameter D2, may be configured to prevent a user from inserting the air channeling apparatus 102 too deeply into the space between the wheel rim 130 and the tire 128. Stated another way, the shoulder 122, or the second outer surface diameter D2, may be sized such that the shoulder, or second outer surface diameter, engages the wheel rim 130 to ensure the air channeling apparatus 102 is inserted into the space between the wheel rim 130 and the tire 128 only up to a predetermined distance.

The wheel 126 may also include a valve stem 134 disposed in the valve stem opening 132 and removably mounted to the wheel rim 130. The valve stem 134 may be of any appropriate manufacture known in the art and suitable for inflation of the corresponding tire 128. Some valve stems 134 may include exterior valve stem threads 136 on at least a portion of the outer surface of the valve stem. Shown at least in FIG. 5, some embodiments of the air channeling apparatus 102 may include an internal passageway 138 having an inner diameter D3. The inner diameter D3 may be constant or may vary along the length of the air channeling apparatus 102 from the supply end 104 to the insertion end 118. Internal threads 140 may be disposed on an inner surface 142 of the air channeling apparatus 102. These internal threads 140 may be configured such that they can threadingly engage the exterior valve stem threads 136 such that the air channeling apparatus 102 may retain the valve stem 134 to push the valve stem into the space between the wheel rim 130 and the tire 128. In many embodiments, the internal threads 140 are disposed on the inner surface 142 nearer the insertion end 118 than the supply end 104 of the air channeling apparatus 102. Other embodiments may include the air channeling apparatus 102 configured to connect to a corresponding valve stem 134 by a quick-connect configuration, some type of detent mechanism, or any other form of selectively removable connection.

In some embodiments, the first outer surface diameter D1 may be sized to a diameter that is at least less than 0.625 inches. In other embodiments, the diameter D1 may be sized to a diameter that is at least less than 0.453 inches. In an embodiment having a first diameter D1 and a second diameter D2, some embodiments may include a D1 diameter that is at least less than 0.625 inches and a D2 diameter that is at least greater than 0.625 inches. In other embodiments, the D1 diameter may be at least less than 0.453 inches and the D2 diameter may be at least greater than 0.453 inches. In yet another embodiment, the diameter D1 may be at least any diameter smaller than the diameter of the valve stem hole 132 to allow insertion of the apparatus 102 into the hole. Similarly, in embodiments which contain a second diameter D2, the diameter may be at least any diameter greater than the diameter of the valve stem hole 132 to only allow a maximum insertion distance of the apparatus.

In addition to having an outer diameter, some embodiments may include an inner diameter D3. Some embodiments may include at least a portion of the inner diameter D3 which is threaded so as to threadingly engage another threaded surface. In one embodiment, the internal threaded portion 140 of the inner surface may have a minor diameter of 0.285 inches to 0.277 inches with 32 threads per inch. In embodiments which include a tether member 150, the first end 152 may have a major diameter of 0.305 inches to 0.297 inches with 32 threads per inch, more preferably having a 0.302 inch major diameter and 32 threads per inch. The second end 154 may include a threaded portion which may be 0.285 inches to 0.277 inches with 32 threads per inch. Generally, valve stems 134 may include male threads which have a 0.302 inch major diameter and 32 threads per inch.

Figure 7:
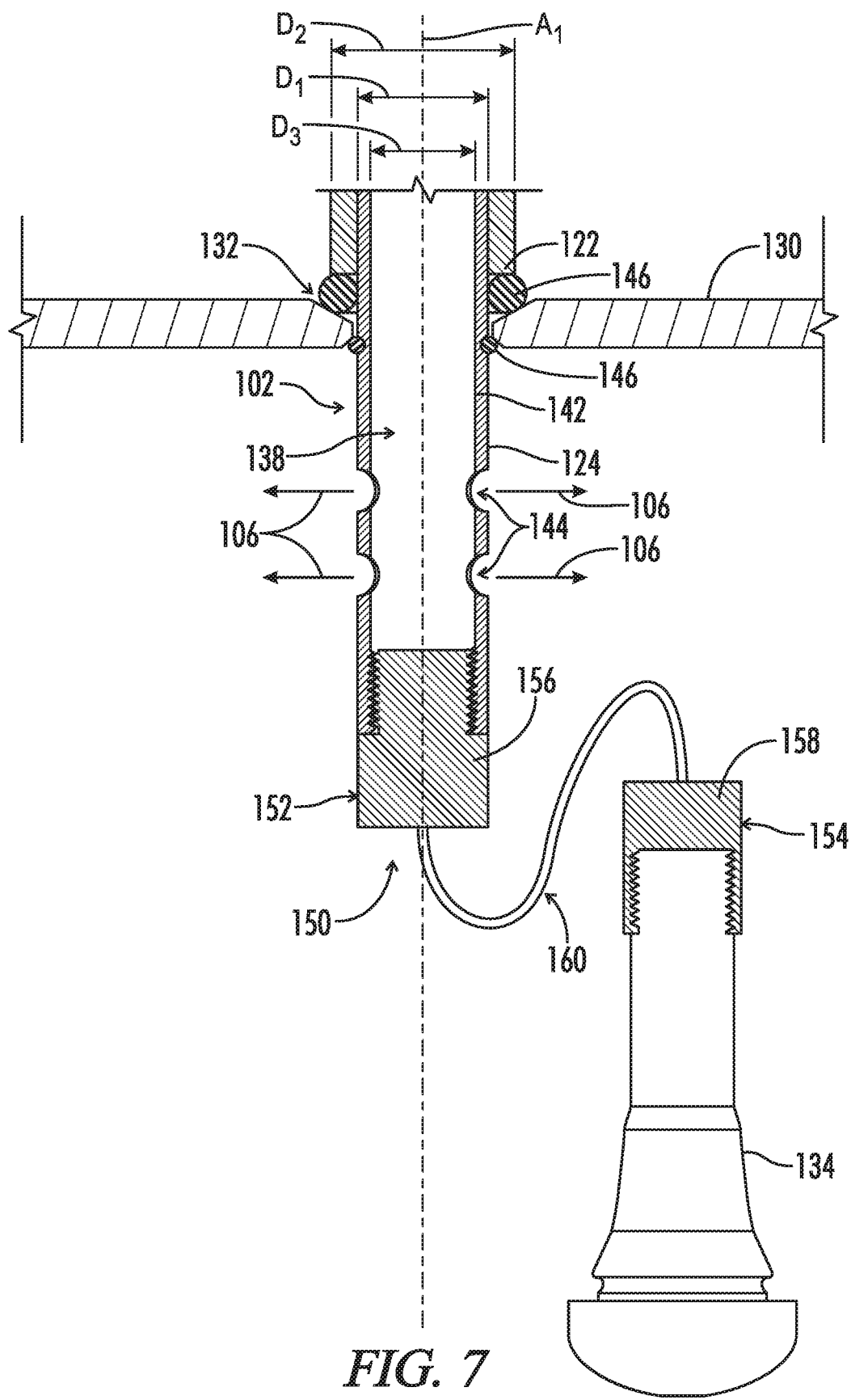
FIG. 7 is a cross-sectional view of the air channeling apparatus including the tether member connected to a valve stem.

As shown in FIG. 7, some embodiments may include the air channeling apparatus 102 connected to the valve stem 134 by a tether member 150. The tether member 150 may include a first end 152 configured to be engage the insertion end 118. In one embodiment, the first end 152 may include a fitting 156 which has exterior threads. The first end 152 may threadingly engage the internal threads 140 of the insertion end 118. The tether member 150 may also include a second end 154 configured to engage the valve stem 134. The second end 154 may include a fitting 158 which has interior threads. The second end 154 may threadingly engage the external threads 136 of the valve stem 134. In some embodiments, the tether member 150 may include a flexible or semi-flexible portion 160 disposed between the first end 152 and second end 154. The flexible or semi-flexible portion 160 may allow the valve stem 134 to hang within the space of the wheel rim 130 and tire 128 so as create more room for the air channeling apparatus 102 to be inserted into the space. This may be advantageous when the space is minimal due to the low profile of the tire, or due to the arrangement of the valve hole 132.

In other embodiments, the insertion end 118 of the apparatus 102 may be configured to attach to the valve stem 134 in a way other than being threaded. In one embodiment, the apparatus 102 may include a clamping mechanism which may engage the valve stem with sufficient pressure to maintain contact throughout the use of the apparatus. In other embodiments, the apparatus 102 may include a quick connect which allows for easy and quick connecting and removal of the valve stem 134 from the insertion end 118.

The air channeling apparatus 102 may include at least one air blast opening 144 defined therein. Shown with particularity in FIGS. 5-6, the at least one air blast opening 144 may extend from the outer surface 124 of the air channeling apparatus 102 to the inner surface 142 of the air channeling apparatus to allow pressurized air 106 to escape from the internal passageway 138. The at least one air blast opening 144, in some embodiments, may be defined in the air channeling apparatus 102 nearer the insertion end 118 than the supply end 104 of the air channeling apparatus. Many embodiments may include the air blast opening 144 defined in the air channeling apparatus 102 such that the air blast opening directs pressurized air 106 in a direction substantially perpendicular to the major axis A1 of the air channeling apparatus. Other embodiments may include the air blast opening 144 defined in the air channeling apparatus 102 such that the air blast opening directs pressurized air 106 at an oblique angle in reference to the major axis A1 of the air channeling apparatus.

In some embodiments, the air blast opening 144 may be round to allow the pressurized air 106 to escape the internal passageway 138. In other embodiments, the air blast opening may be a slit which allows the pressurized air 106 to be released and directed in a different manner than a round opening. In other embodiments, the air blast opening may be square, oval, or any other shape suitable for allowing the pressurized air 106 to escape from the internal passageway 138. In yet other embodiments, the air blast opening 144 may be defined at an angle from the outer surface 124 to the inner surface 142. The angled air blast opening 144 may allow for the pressurized air to be directed into the space between the tire 128 and rim 130 at an angle which is substantially the same as the angle of the opening.

At least one embodiment may include the at least one air blast opening 144 being a plurality of air blast openings. In one embodiment, the air channeling apparatus 102 may include two air blast openings 144 located at the same position, but on contralateral sides of the apparatus. In another embodiment, the air channeling apparatus 102 may include two air blast openings 144 located on the same side of the apparatus and spaced apart along the major axis A1 of the apparatus. In addition, or alternatively, another two air blast openings 144 may be located in similar positions but on the contralateral side of the apparatus 102. In some embodiments, the air channeling apparatus 102 may include a plurality of air blast openings 144 which are arranged adjacent to each other around the circumference of the apparatus 102. The air blast openings 144 may or may not be evenly spaced about the outer surface 124 of the air channeling apparatus 102.

Shown in FIGS. 5-7, some embodiments of the air blast assembly 100 may further include at least one seal 146. The seal 146 may be an O-ring in some embodiments. The seal 146 may be disposed about the air channeling apparatus 102. When the insertion end 118 of the air channeling apparatus 102 is inserted into the valve stem opening 132, the seal 146 may engage the wheel rim 130 and the outer surface 124 of the air channeling apparatus to form at least a partial seal between the two. This at least partial seal may prevent at least some of the pressurized air 106 from escaping from the space between the wheel rim 130 and the tire 128 through the valve stem opening 132. In one embodiment, the seal 146 may be disposed about the air channeling apparatus 102 and against the shoulder 122, or at the transition from the first outer surface diameter D1 to the second outer surface diameter D2. In such an embodiment, the shoulder 122, or transition, may push the seal 146 against the wheel rim 130 when a user exerts an insertion force on the air channeling apparatus 102.

In some embodiments, two seals 146 may be used. A first seal disposed about the air channeling apparatus 102 and against the shoulder 122, or at the transition from the first outer surface diameter D1 to the second outer surface diameter D2. Additionally, a second seal may be disposed about the air channeling apparatus 102 and located between the first seal disposed about the shoulder 122 and an air blast opening 144. In some embodiments, the air channeling apparatus may include a groove, or indentation, which is disposed about the circumference of the apparatus between the shoulder 122 and an air blast opening 144. The groove, or indentation, may extend below the first maximum outer surface diameter 124, but not beyond the inner surface 142, thus allowing the second seal to seat within the groove. The first seal may engage the wheel rim 130 and the outer surface 124 of the air channeling apparatus to form at least a partial seal between the two. The second seal may engage the wheel rim 130 and the outer surface, but is located within the space between the tire 128 and rim 130 so as to create at least a second partial seal.

It should be understood that the air channeling apparatus 102 may be a stand-alone system that may have its own dedicated air supply line and machinery which allows for the apparatus to be used. Alternatively, the air channeling apparatus 102 may be incorporated into existing tire changing and air filling stations so as to allow the user to not have to remove the tire and go to different stations to complete the process of changing a tire, filling a tire with air, or the like. Other stations may include, but are not limited to a tire changer device, tire balancer device, inflation device, or the like.

Many accessories can be added to the air blast assembly 100 to facilitate the speed of operation in using the air blast assembly. Non-limiting examples of the accessories may include: a handle system for installing the valve stem 134 in the wheel rim 130, a system to prevent over inflation of the tire 128 via a relief valve system 148, a gauge 150 to assist in correct observation of pressure inside the space between the tire and the wheel rim, and the like. In some embodiments, the air blast assembly may be pneumatically connected to an air system on a tire changing machine. In some such embodiments, the trigger on the air blast assembly may be eliminated. In other embodiments, the air blast assembly may be used in conjunction with other known tire sealing devices including, but not limited to table top sealing devices or single point sealing devices.

The present invention also relates, in part, to a method of using an air channeling apparatus 102 to seal a tubeless tire 128 on a corresponding wheel rim 130. The method may include threading an air channeling apparatus 102 onto a valve stem 134 that is disposed in a valve stem hole 132 defined in the wheel rim 130; inserting an insertion end 118 of the air channeling apparatus into a space between the tire 128 and the rim through the valve stem hole with the valve stem retained on the insertion end of the air channeling apparatus; blasting at least one stream of pressurized air 106 into the space between the tire and the rim through the air channeling apparatus and through at least one air blast opening 144 defined in the air channeling apparatus; sealing the tire to the rim; withdrawing the insertion end of the air channeling apparatus from the space between the tire and the rim through the valve stem hole; securing the valve stem in place in the valve stem hole; and unthreading the air channeling apparatus from the valve stem. In many embodiments, the air channeling apparatus 102 may be withdrawn from the space between the wheel rim 130 and the tire 128 to reseal the valve stem 134 on the wheel rim in the valve stem hole 132 while maintaining enough air pressure in the tire that is sufficient to maintain an air lock between the tire and the wheel rim.

This written description uses examples to disclose the invention and also to enable any person skilled in the art to practice the invention, including making and using any devices or systems. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Although embodiments of the invention have been described using specific terms, such description is for illustrative purposes only. The words used are words of description rather than limitation. It is to be understood that changes and variations may be made by those of ordinary skill in the art without departing from the spirit or the scope of the present invention, which is set forth in the following claims. In addition, it should be understood that aspects of the various embodiments may be interchanged in whole or in part. While specific uses for the subject matter of the invention have been exemplified, other uses are contemplated. Therefore, the spirit and scope of the appended claims should not be limited to the description of the versions contained herein. Thus, although there have been described particular embodiments of the present invention of a new and useful "Valve Stem Hole Tire Sealing Device", it is not intended that such references be construed as limitations upon the scope of this invention except as set forth in the following claims.

What is claimed is:

1. An air channeling apparatus for sealing a tubeless tire on a corresponding wheel rim having a valve stem hole defined therein, the air channeling apparatus comprising:
   a supply end configured to receive pressurized air from an air supply;

an insertion end opposite the supply end, the insertion end having an outer surface and an inner surface;

the outer surface having a first outer surface diameter sized such that the insertion end of the apparatus can pass through the valve stem hole of the wheel rim;

the inner surface comprising a threaded portion configured to threadingly engage another threaded surface; and at least one opening defined in the insertion end, the at least one opening extending from the outer surface to the inner surface.

2. The air channeling apparatus of claim 1, wherein the outer surface further includes at least a second outer surface diameter sized larger than the first outer surface diameter.

3. The air channeling apparatus of claim 2, wherein the distance between the at least second outer surface diameter and the first outer surface diameter delimits a maximum insertion distance of the insertion end.

4. The air channeling apparatus of claim 1, further comprising at least one seal disposed about the outer surface configured to engage the wheel rim.

5. The air channeling apparatus of claim 3, further comprising at least one seal disposed about the apparatus at a transition from the first outer surface diameter to the second outer surface diameter, wherein the seal is configured to engage the wheel rim.

6. The air channeling apparatus of claim 3, further comprising:
at least one first seal disposed about the apparatus at a transition from the first outer surface diameter to the second outer surface diameter; and
at least one second seal disposed about the outer surface, the at least one second seal located between the at least one first seal and at least one opening.

7. The air channeling apparatus of claim 1, wherein the at least one opening defined in the apparatus comprises a plurality of openings.

8. The air channeling apparatus of claim 7, wherein each of the plurality of openings defined in the apparatus is configured to direct pressurized air in a direction substantially perpendicular to the insertion end.

9. The air channeling apparatus of claim 7, wherein each of the plurality of openings defined in the apparatus is configured to direct pressurized air at an oblique angle to the insertion end.

10. The air channeling apparatus of claim 1, further comprising a valve assembly configured to allow pressurized air to pass from the air supply to the air channeling apparatus through a valve.

11. The air channeling apparatus of claim 10, wherein the valve assembly comprises a trigger which is hand-operated configured to actuate the valve.

12. The air channeling apparatus of claim 1, further comprising a pressure gauge configured to display the pressure between the tire and rim.

13. The air channeling apparatus of claim 1, further comprising a pressure relief valve configured to relieve pressure when a threshold pressure is achieved.

14. The air channeling apparatus of claim 13, wherein the threshold pressure is between 20-40 psi.

15. The air channeling apparatus of claim 1, wherein the inner surface is configured to threadingly engage a valve stem.

16. The air channeling apparatus of claim 1, wherein at least a portion of the outer surface comprises a non-marring material along the insertion end.

17. A method of sealing a tubeless tire on a corresponding wheel rim, the method comprising:
(a) threading an air channeling apparatus onto a valve stem disposed in a valve stem hole defined in the wheel rim;
(b) inserting an insertion end of the apparatus into a space between the tire and the rim through the valve stem hole with the valve stem retained by the apparatus;
(c) blasting at least one stream of pressurized air into the space between the tire and the rim through the apparatus and through at least one opening defined in the apparatus;
(d) sealing the tire to the rim;
(e) withdrawing the insertion end of the apparatus from the space between the tire and the rim through the valve stem hole;
(f) securing the valve stem in place in the valve stem hole; and
(g) unthreading the apparatus from the valve stem.

* * * * *